June 19, 1934.                S. B. GRISCOM                1,963,166
                         NEUTRAL IMPEDANCE DEVICE
                         Filed March 24, 1931        2 Sheets-Sheet 1
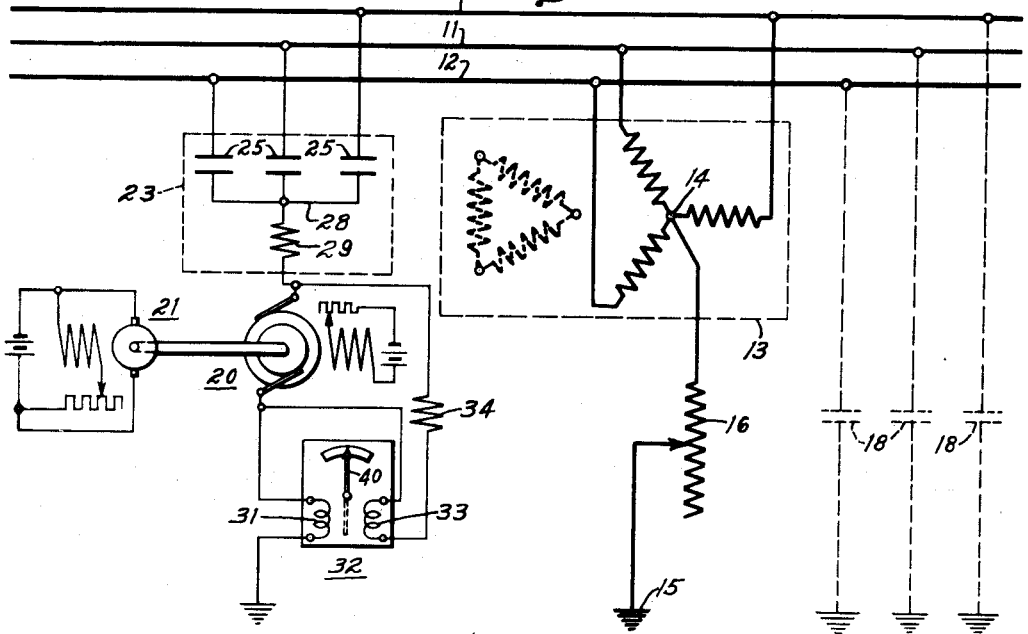
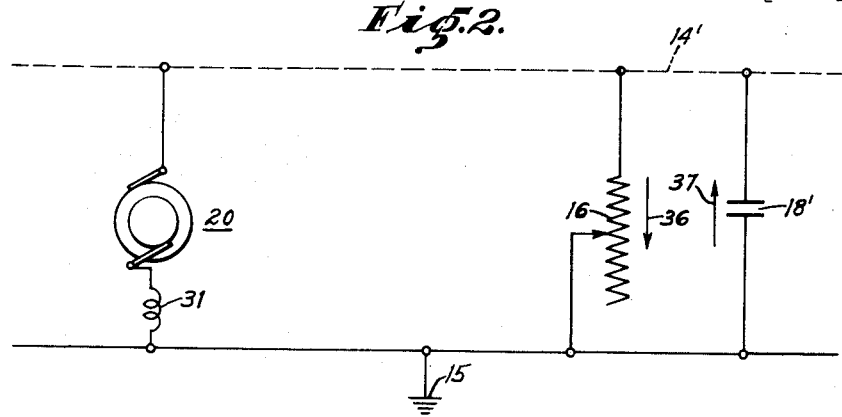
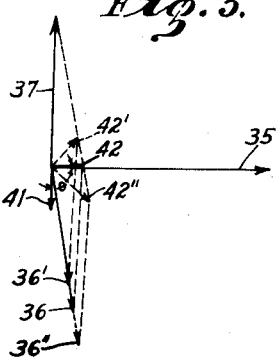
WITNESSES
R. S. Williams
Carlton F. Bryant
INVENTOR
Samuel B. Griscom
BY
Wesley G. Carr
ATTORNEY June 19, 1934. S. B. GRISCOM 1,963,166
NEUTRAL IMPEDANCE DEVICE
Filed March 24, 1931 2 Sheets-Sheet 2

WITNESSES

INVENTOR
Samuel B. Griscom
BY
ATTORNEY

UNITED STATES PATENT OFFICE 1,963,166

NEUTRAL IMPEDANCE DEVICE

Samuel B. Griscom, Swissvale, Pa., assignor to Westinghouse Electric & Manufacturing Company, a corporation of Pennsylvania Application March 24, 1931, Serial No. 524,808

12 Claims. (Cl. 172—237)

My invention relates to alternating-current electric systems in which neutral grounding reactors are utilized to suppress earth-leakage arcs, and has particular relation to means for indicating the relation of such reactors to the system to which they are connected.

There are known arrangements of reactors in alternating-current electric systems, to suppress or neutralize the earth-leakage or earth-fault-charging current which, upon the accidental contact of a conductor to ground, flows in the earth connection.

In order that such reactors may be completely effective to suppress the earth-current arc, it is necessary that the neutral-grounding reactors be properly tuned to develop a current that is equal and opposite, in phase, to that developed by the system capacitance to earth, for it has been shown that protective arrangements of this character can perform the desired neutralizing function only within a rather narrow range of adjustment or tuning, within which range there exists a resonant condition.

There is considerable practical difficulty in properly adjusting such neutral-grounding devices to the critical value because of the fact that, in the past, it has been difficult to determine the accuracy of an adjustment without resorting to rather elaborate tests and complicated electrical measurements. Such difficulty is further increased by the condition that the number of circuits in use in the system may vary from time to time, requiring that the value of the reactance in the neutral circuit shall be changed to compensate for the different values of system capacitance to earth.

My invention is directed to a solution of the problem of maintaining system neutral grounding reactances at the proper degree of tuning. I contemplate the use of a tuning-degree indicator comprising means responsive to deviations from resonance between the system earth capacitance and the neutral grounding reactance.

It will be apparent to those skilled in the art that a tuning degree indicator of the type which I am about to describe is particularly applicable where a large number of neutral grounding devices are installed in the same system, and where it is desired to change or adjust them manually as portions of the system are cut in and out of service, as well as in practically all other applications in which arc-suppressing means of the neutral grounding type are utilized.

Broadly stated, it is an object of my invention to provide means for increasing the effectiveness of neutral-grounding devices utilized with alternating-current systems for the suppression of earth-leakage arcs.

More specifically, it is an object of my invention to provide, in alternating-current systems with which neutral grounding reactors are utilized, means for indicating the degree of tuning of the reactors with the system capacitance to earth.

It is another object of my invetion to provide an indicating system of the type described which shall be disposed to automatically initiate corrections in the tuning of the neutral grounding reactance of the alternating-current system protected.

A further object of my invention is to provide an indicating system of the type described which, in addition to being disposed to automatically initiate corrective tuning adjustments of the neutral grounding reactance, is capable of maintaining the tuning of the reactance at the resonance condition, with respect to the system capacitance to earth, or at predetermined other values above or below the resonance value.

A still further object of my invention is to provide, with an alternating-current system, means for controlling the electrical dimensions of the neutral grounding device in a manner to make it self-compensating for changes in the capacitance to earth of the system.

In practicing my invention, I attain these and other objects by impressing by means of a suitable coupling circuit, an alternating-current electromotive force of appropriate magnitude and frequency between ground and the system line conductors. I then utilize the magnitude and phase relation of the current thus caused to flow in this coupling circuit to actuate suitable indicating means which are disposed to be responsive to deviations, which directly affect this coupling-circuit current, from the desired degree of tuning of the neutral grounding reactance with the system capacitance to earth. The necessary corrective adjustments of the neutral reactance may then be made, in the system of my invention, manually or, if desired, automatically.

My invention, together with additional objects and advantages thereof, will best be understood from the following description of specific embodiments, when read in conjunction with the accompanying drawings, in which:

Figure 1 is a diagrammatic view of apparatus and circuits utilized in one modification of my invention as applied to a three-phase, alternating-current system;

Fig. 2 is a simplified schematic representation of the basic indicating circuits of the system of Fig. 1;

Fig. 3 is diagram vectorially representing the voltage and currents which act upon the indicating means utilized in the system of Fig. 1.

Figure 4:
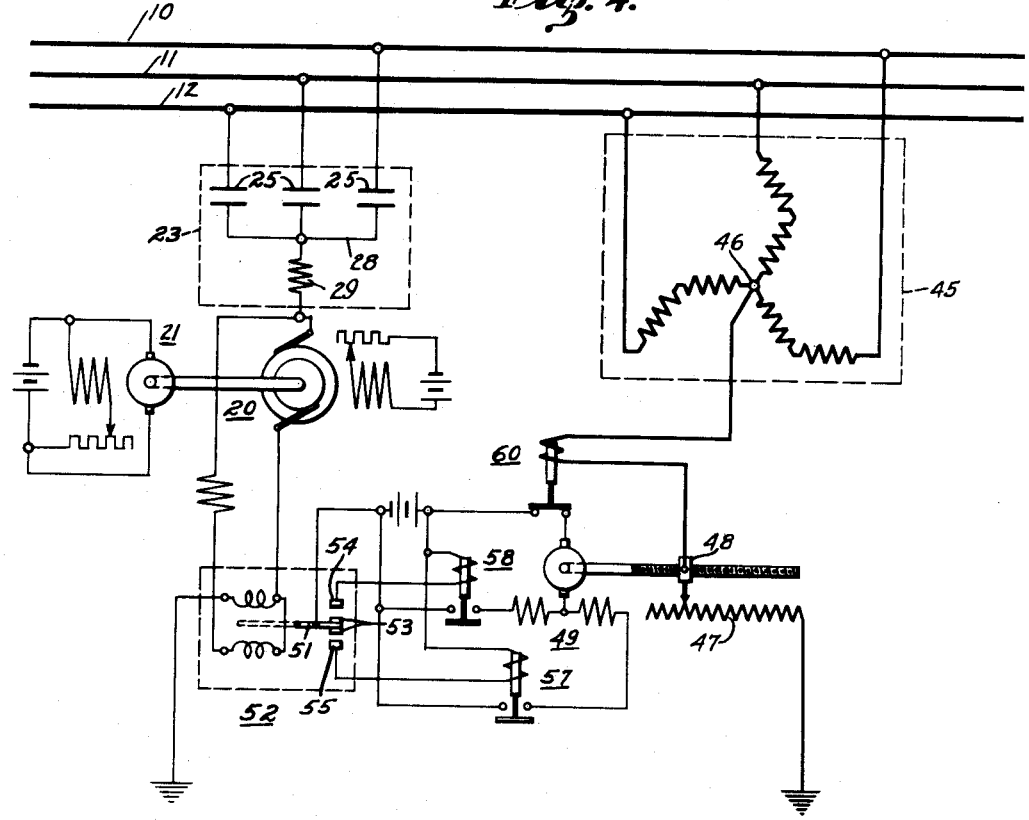
Fig. 4 is a diagrammatic representation of apparatus illustrating my invention as applied to a three-phase alternating-current system, disposed to automatically maintain the neutral grounding reactor tuned to the system.

Referring to the drawings, particularly Fig. 1 thereof, the line conductors of a three-phase alternating-current system are represented at 10, 11 and 12. Means for establishing an electrical neutral in the system are shown at 13 in the form of a "star-delta" neutral grounding transformer of a well known type, the neutral point of the system being established at 14. Between point 14 and the ground 15, an adjustable grounding reactor 16 is connected in a well known manner, for the purpose of suppressing accidental ground faults which may occur upon any of the lines 10, 11 and 12. The capacitance to ground of the system lines is diagrammatically represented at 18 by the three condensers there shown.

Between the system conductors and ground, I impress an alternating-current voltage which, in the system of Fig. 1, is supplied by a generator 20 disposed to be driven at a constant speed, of adjustable magnitude, by means of a suitable driving motor 21. The voltage of the generator 20 need be of only a relatively small value, and the range of frequency adjustment thereof preferably includes the value corresponding to the frequency of the main power-circuit voltage acting in system conductors 10, 11 and 12, for reasons to be made evident. It will be understood that any other suitable source of potential may be utilized in place of the generator 20 without departing from the spirit of my invention.

To provide means for impressing upon the system conductors the single-phase indicating voltage supplied by generator 20, I utilize the coupling arrangement shown, in Fig. 1, at 23, or its equivalent. The assembly 23 comprises three star-connected condensers 25 joined, respectively, to system conductors 10, 11 and 12. The common connection 28 of these condensers is connected to one terminal of generator 20 by means of a power-factor or phase-angle-correcting element represented in the form of an inductor 29. The other terminal of generator 20 is connected to ground through a current winding 31 of a current phase-position and magnitude-indicating device shown, generally, at 32.

The electrical dimensions of inductor 29, with respect to those of condensers 25, are preferably such as to permit a current transfer from generator 20 to the system line conductors without appreciable phase displacement resulting from the action of the coupling assembly. It will be apparent that other equivalent coupling arrangements may also be utilized, such as, for instance, the combination of three star-connected inductances and a series-connected condenser, in place of assembly 23 shown. In certain cases, furthermore, it will be unnecessary to use the inductive reactance 29 in series with the coupling condensers, as it is merely necessary for the device to pass enough current for the required indicating purposes to be described, and, under proper conditions, the capacitors alone will be sufficient to take care of this.

The indicating device 32 comprises, in addition to the current winding 31, a potential winding 33 that is energized by generator 20 through a series-connected inductance 34. The inductor 34 is included in this circuit and causes the current through winding 33 of the indicating device 80 to lag behind the voltage supplied by generator 20 by an angle of substantially 90 degrees, to permit the indicator to function in the manner desired, as will be explained.

In certain cases, particularly where a phase-angle error is incurred, either through inductance 29 or otherwise, a correction may be made by the use of inductive or capacitive shunts in parallel with either coil 31 or coil 33, or by the addition of resistance in series with coil 33, according to the correction required for a particular case.

The method of operation of the system of Fig. 1 can best be understood through reference to the diagram of Fig. 2, in which the current circuits of the tuning-degree indicator of my invention are schematically represented in simplified form.

In Fig. 2, the electrical neutral of system conductors 10, 11 and 12 is represented by the dotted line 14′ which, under balanced conditions of the system, is a symmetrical neutral line for the three conductors mentioned and, for purposes of explaining the operation of my invention, it may be assumed that this hypothetical conductor 14′ carries all of the current which generator 20 causes to flow through the system conductors named. A careful consideration of the circuits involved will show that such an assumption is in no way inconsistent, insofar as the actual operation or performance of the indicating system is concerned.

It will be seen that the voltage of generator 20 acts upon neutral grounding reactance 16 in parallel with the equivalent system capacitance of neutral 14′ to ground, which capacitance is represented, in Fig. 2, by symbol 18′. The potential being impressed between neutral 14′ and the ground 15, current is thus caused to flow from neutral 14′ to ground through two separate paths, viz., the inductive circuit 16 and the capacitive circuit 18′. It will be seen that the sum of these two currents returns to generator 20 through current winding 31 of the device 32.

The vector relations of the impressed voltage and the resulting currents are illustrated in the diagram of Fig. 3, in which the horizontally drawn vector 35 represents, at some given instant, the magnitude and direction of the voltage impressed, between the system conductors and the ground, by generator 20, vector 36, representing the current flowing through neutral-grounding reactor 16, and vector 37 representing the current flowing through the system capacitance to ground.

It will be observed that reactive current 36 lags behind the voltage 35 by a large angle, represented as of a value somewhat less than the 90° or 100% inductive reactance value, to take into account the effect of the resistance inherently present in the circuit 16. Likewise, the capacitance current 37 leads the impressed voltage 35 by an angle of substantially 90 degrees. It will be understood that, for purposes of greater clarity, the deviation of vectors 36 and 37 from the 90° displaced positions have been exaggerated to more distinctly bring out the various relations which exist.

Indicating device 32 is, preferably, of the well known reactive-factor responsive type in which the movable element 40 carries a movable coil, which, in the present instance, we may assume to be potential coil 33, arranged to be magnetically acted upon by a stationary coil, which corresponds to current coil 31. The mechanical details of device 32 are not represented, since they form no part of this invention and are well known in the art.

In Fig. 3, vector 41 indicates the current flowing in potential coil 33 of device 32, as a result of voltage 35 acting upon the circuit, which includes inductance 34. The well known effect of such a series-connected inductance is to cause the phase displacement between the impressed voltage and the current flowing in the circuit to be substantially 90 degrees and is so represented in the diagram of Fig. 3.

The current flowing through the current coil 31 of the reactive factor responsive device 32 will be seen to be the sum of currents 36 and 37, which, in the diagram of Fig. 3, is represented by vector 42. For the condition illustrated, the phase angle "theta" between vectors 41 and 42 is 90 degrees, and, for such a phase relation, there will be no effective torque interaction between coils 31 and 33, in which case, movable element 40 will remain in the neutral or mid-position illustrated in Fig. 1.

Assuming that the frequency of generator 20 is the same as that of the power voltage acting in system conductors 10, 11 and 12, the condition represented by the vectors of Fig. 3, just named, corresponds to a resonant relation between the neutral grounding reactance 16 and the system capacitance to ground 18 at the system frequency, since, in the diagram, vectors 36 and 37 are of substantially equal magnitudes, which, as is known, is the condition of electrical resonance or substantial neutralization of the capacitive current 37 by the reactive current 36.

Let it be assumed that the reactance of the neutral-grounding device 16 is now increased. This acts to lower the current passed through the device 16 to some such value as is indicated by the vector 36', in the diagram of Fig. 3. As a result of this decrease in current, the total current supplied by generator 20 is correspondingly changed to the different magnitude and phase position indicated by 42'. It will be observed that, for this condition, the angle between the current 41 in the potential coil 33, of the reactive-factor meter, and the current 42' in the current coil 31 thereof, has been increased to a value appreciably in excess of 90 degrees.

The result of this displacement increase is a net effective torque interaction between the two coils named, which torque functions to shift the position of movable element 40 of the meter in a given direction away from the mid-position, thereby indicating this detuned condition. It will be understood that the magnitude and direction of such shift may readily be made to depend upon the degree of deviation from the desired condition of tuning of the neutral grounding reactor 16 with respect to the system capacitance to ground 18'.

Let it be assumed, likewise, that the reactance of the device 16 is changed to a value lower than that desired. In such case, the reactive current resulting from the impressed voltage 35 is increased to some such value as is indicated in Fig. 3 by the vector 36'', and the total current flowing through the winding 31 of the indicating meter is shifted in magnitude and vector position to 42''. It will be seen that the angle between the currents acting in coils 31 and 33 of device 32 has been decreased to a value appreciably less than 90 degrees, and this results in a torque interaction between the coils which tends to shift the movable element 40 from the neutral position, in a direction opposite to that of the first assumed deviation. Thus, there is provided an indication that the neutral-grounding reactance is detuned in the lowered-reactance direction from the resonance condition of the system capacitance to ground.

A further examination of the vector diagram of Fig. 3 will indicate that at the condition of resonance tuning, the reactive current 36 substantially neutralizes the capacitive current 37, so that the current flowing through winding 31 of the indicator is extremely small, approaching zero as the resistance in the circuits is reduced. Deviation from the resonance condition causes either the capacitive or the reactive component to predominate, depending upon the direction of the deviation, thereby causing a corresponding actuation of the indicating device 32.

It will be seen, therefore, that, in a system arranged as in accordance with Fig. 1, movement of indicator element 40 in one direction from the neutral position indicates a detuning of the neutral-grounding reactance below the condition of resonance with the system capacitance-to-ground, while a movement of element 40 in the opposite direction indicates a detuning above the resonance condition, the magnitude of the movement being proportional to the degrees of detuning. Consequently, when generator 20 supplies a voltage of normal system frequency to the indicating system, a deviation of indicator 40 from the neutral position may be utilized to inform an operator as to the changes or adjustments necessary in the grounding reactance 16 to restore the tuning to the resonance value.

Experience has shown that, in certain installations of neutral grounding devices, best results are obtainable when the reactance is tuned to some given value slightly above or below the resonance condition. The system of my invention will be seen to be adjustable to provide for such an operating condition, since the neutral position of movable element 40 may be made to correspond to practically any condition of tuning within a range above or below, as well as at, the resonance value.

Such provision is effected through the adjustability of the frequency of the voltage impressed between the system conductors and ground by generator 20, by suitably changing the speed of the driving motor 21. It is well known that the magnitude of the reactance of an inductive circuit is a direct function of the frequency of the voltage acting upon that circuit, the ohmic value thereof being determined by the product of the inductance, the voltage frequency and a suitable constant. Likewise, it is universal knowledge that the capacitive reactance of a capacitive circuit is inversely proportional to the frequency of the voltage acting upon that circuit, the ohmic value thereof being the reciprocal of the product of the circuit capacitance, the voltage frequency and a suitable constant.

Therefore, an increase in the frequency of the impressed indicating voltage increases the inductive reactance of circuit 16 and decreases the capacitive reactance of circuit 18' (Fig. 2), making the current passed by the grounding reactance 16 relatively less, and the current passed by the system capacitance to earth relatively greater. To restore the indicating system to resonance, therefore, it is necessary to decrease the reactance of the grounding reactor. Such resonance having been re-established, the movable element 40 of indicator 32 will again assume a neutral position, but, since the indicating-generator frequency is above the main system frequency, the neutral indication no longer corresponds to a condition of system resonance but rather to a condition in which the value of the neutral grounding reactance is below that required for resonance at the system frequency.

In a similar manner, a decrease in the frequency of generator 20 below the system value makes it necessary to increase the value of neutral grounding reactance to bring the indicator 40 to the neutral position. It will be apparent, therefore, that practically any given value of grounding reactance may be made to correspond to the neutral indication of device 32 by suitably regulating the frequency of the indicating voltage impressed between the system conductors and the ground. This expedient or feature will be appreciated to be particularly valuable in those cases, already mentioned, in which a slight detuning is found to give most effective arc suppression, and it further increases the usefulness of the indicating scheme beyond that which it would possess if it were capable of indicating only the resonance tuning at the frequency of the main power voltage acting within the system.

In Fig. 4, I have illustrated my invention disposed to automatically effect tuning adjustments of a system neutral-grounding reactance of the general type under consideration. The electrical neutral of the three-phase-system conductors is established through any suitable means, such as a "zigzag" transformer 45, of well known type, which fixes the neutral at point 46 therein. A grounding reactor 47 is disposed for adjustment by means of movable contact 48, the position of which is shifted by rotation of a suitable motor 49.

Conditions which cause the value of the reactance to deviate from the desired tuned condition, operate, in the manner already explained in connection with the system of Fig. 1, to cause the movable element 51 of the indicating device 52, which is essentially the same as device 32 already described, except that the movable element thereof carries contacts, to bring contact element 53 into engagement with one of the stationary contact members 54 and 55, to initiate a reactance corrective adjustment through a suitable control system. Since the control system, in itself, may be any one of a number of extensively recognized types well known in the art, a detailed explanation of the functioning of the one which I have represented in Fig. 4 is not deemed necessary.

In operation of the system of Fig. 4, let it be assumed that, to restore the neutral grounding reactor 47 to the desired degree of tuning, it is necessary to lower its value of reactance. The detuned condition of the system, is detected by indicating device 52 which moves the contact member 53 into engagement with the contact member 55, thereby energizing relay 57 which, in closing its contact, energizes motor 49 to cause it to rotate in the reactance-lowering direction. The correction having been made, and the resonance conditions restored, contact 53 of the indicator moves out of engagement with contact 55, and the further change or adjustment in neutral grounding reactance value is discontinued.

In a similar manner, conditions which necessitate an increase in the reactance value to restore the system to the desired degree of tuning, cause contact 53 to move into engagement with contact 54, thereby energizing relay 58 which, in closing, causes motor 49 to rotate in the reactance-raising direction to restore the system to the proper condition desired.

Upon the occurrence of an accidental ground fault in the system, it is desirable that the indicator of my invention be restrained from shifting the adjustment of the neutral-grounding reactance. To provide such selective control, I combine with the system of Fig. 4, a current-responsive relay 60 disposed in the circuit of the system neutral to ground. A current flowing in this circuit, such as is set up by occurrence of the ground fault, actuates relay 60 to the upward position, thereby deenergizing the reactance-adjusting motor 49 by opening its energizing circuit. This action prevents inaccurate indications, such as would be set up by the unbalanced voltages to ground acting in condensers 25 of the coupling device 23, from operating the reactance-adjusting motor, when one of the line conductors becomes accidentally faulted. At all other times, however, it will be evident that the indicating system of my invention has full control.

It should be further noted that difficulties in the operation of the indicating system of my invention, when the indicating voltage is of a frequency exactly corresponding to that of the system which, in certain cases, might arise from harmonic or other interference by the system power voltage, may be eliminated by adjusting the frequency of the piloting generator to a value slightly different from that of the system. The degree of tuning compensation maintained may then be controlled by suitable position-displacing means, well known in the art, combined with the movable element of the indicating device 32, entirely apart from the change-in-compensation method attainable by frequency adjustment, as already described. It will be apparent, therefore, that any possible difficulties from this source may be completely overcome.

Although I have shown and described certain specific embodiments of my invention, I am fully aware that many modifications thereof are possible. My invention, therefore is not to be restricted, except insofar as is necessitated by the prior art or by the spirit of the appended claims.

I claim as my invention:

1. In combination with an alternating-current system utilizing a tuned-neutral-grounding reactor connected between the system conductors and ground in parallel with the conductor system capacitance to ground, means for indicating the degree of tuning of said reactor with the system conductor capacitance to ground comprising a source of alternating-current potential, connecting means for impressing said potential between the ground and the system conductors to cause the flow of current therebetween through said parallel connected reactor and capacitance, and an indicating device included in said connecting means and responsive to the phase relation between said impressed potential and the total resulting current.

2. In combination with an alternating-current system utilizing a tuned-neutral-grounding reactor connected between the system conductors and ground in parallel with the system conductor capacitance to ground, means for indicating the degree of tuning of said reactor with the system conductor capacitance to ground comprising an alternating-current voltage impressed between the ground and the said system conductors to cause the flow of current in parallel paths through said reactor and said capacitance, and means responsive to the magnitude and phase position of the total current caused to flow by said potential.

3. In combination with an electrical system comprising an alternating-current apparatus having a neutral point and an inductor connected between said neutral point and ground, means for indicating the degree of tuning of said inductor with the system conductor capacitance to ground comprising a source of alternating-current voltage, means for impressing said voltage between said system conductors and the ground, and means responsive to the magnitude and phase position of the combined current thus caused to return to ground from the system conductors through the said inductor and through the system earth capacitance.

4. In combination with an alternating-current system comprising a plurality of phase conductors, means for establishing an electrical neutral point in said system, and means for connecting said neutral point to the ground through an inductive circuit, means for indicating the degree of tuning of said inductive circuit with the system capacitance to ground comprising a source of alternating-current potential, means for impressing said potential between the ground and said system conductors whereby current is caused to flow in parallel paths through said inductive circuit and through the conductor system capacitance to ground, and means for measuring the magnitude and phase position of the total current caused to flow by said potential.

5. In an alternating-current electric system comprising an apparatus having a neutral point, an inductor connected between said neutral point and the ground, a source of normal-system-frequency alternating-current voltage, means for impressing said voltage between the ground and said system conductors to cause currents to flow through said inductor and through the conductor system capacitance to ground in parallel circuit relation, and indicating means responsive to the phase angle between the said impressed voltage and the total current flowing from said system conductors to ground as a result of said voltage.

6. In an alternating-current electric system comprising an apparatus having a neutral point, an inductor connected between said neutral point and the ground, and means for adjusting the electrical dimensions of said inductor, a source of normal-system-frequency alternating-current voltage, connecting means for impressing said voltage between the ground and said system conductors, and indicating means responsive to the phase angle between the said impressed voltage and the total current flowing as a result of said voltage, from said source through the parallel circuits established between the system conductors and ground comprising the inductor and the system capacitance to ground, said indicating means being disposed to control the operation of said inductor-adjusting means to maintain the tuning thereof at the resonance value.

7. In a system of electrical transmission and distribution, in combination with means for establishing an electrical neutral point between the several conductors thereof, a connection leading from said neutral point to ground, and a reactor included in said connection, means for impressing an auxiliary alternating-current potential between the ground and the system conductors, and means responsive to the vector sum of the currents thus caused to flow from said conductors to ground through the neutral grounding reactor and through the system earth capacitance, said responsive means being disposed to indicate the degree of tuning of said reactor with the system earth capacitance.

8. In a system of electrical transmission and distribution, in combination with means for establishing an electrical neutral point between the several conductors thereof, a ground connection leading from said neutral point, and a reactor connected in said ground connection, means for adjusting the electrical dimensions of said reactor and motive means for the operation thereof, means for impressing an auxiliary alternating-current potential between the ground and the system conductors, and means responsive to the vector sum of the currents thus caused to flow from said conductors to ground through the neutral grounding reactor and through the system earth capacitance, said responsive means being disposed to indicate the degree of tuning of said reactor with the system earth capacitance and to initiate corrective tuning adjustments by controlling the operation of said motive means in response to deviations from the resonance tuned condition.

9. In combination with an alternating-current system utilizing neutral-grounding reactors to effect the suppression of earth fault currents, means for indicating the degree of tuning of said reactors with the system earth capacitance comprising a source of alternating-current potential, means for adjusting the frequency of said source, connecting means for impressing said potential between the ground and the conductors of said system, and a reactive-factor meter disposed to be responsive to the phase relation between said potential and the combined currents thus caused to flow from said conductors to ground through said neutral reactances and the system earth capacitance, said meter thus indicating the magnitude and direction of deviations in grounding reactance tuning from the resonance condition at the frequency of said impressed potential.

10. In combination with an alternating-current system having an electrical neutral point, an inductor connected between said neutral point and the ground, means for adjusting the electrical dimensions of said inductor to effect tuning thereof, means for indicating the degree of tuning of said inductor with the system earth capacitance comprising a source of alternating-current potential, means for adjusting the frequency of said source, connecting means for impressing said potential between the ground and the conductors of the system, a reactive-factor meter disposed to be responsive to the phase relation between said potential and the combined currents thus caused to flow from said conductors to ground through said inductor and the system earth capacitance, said meter thus indicating the direction of deviation in grounding inductance tuning from the resonance condition at the frequency of the said impressed potential, and means whereby said meter may be further disposed to control the operation of said electrical dimension adjusting means of the inductor to automatically maintain a desired degree of tuning.

11. In combination with an alternating-current system utilizing neutral-grounding reactors to effect the suppression of earth fault currents, means for indicating the degree of tuning of said reactors with the system earth capacitance comprising a source of alternating-current potential, means for adjusting the frequency of said source, star-connected capacitors respectively joined with the conductors of said system, an inductance connected to the common point of said star connection, means for impressing said potential between the ground and said inductance, and a reactive-factor meter disposed to be responsive to the phase relation between said potential and the combined currents thus caused to flow from said conductors to ground through said neutral reactances and the system earth capacitance, said meter thus indicating the magnitude and direction of deviations in grounding reactance tuning from the resonance condition at the frequency of said impressed potential.

12. In combination with an alternating-current system having an electrical neutral point, an inductor connected between said neutral point and the ground, means for adjusting the electrical dimensions of said inductor to effect tuning thereof, means for indicating the degree of tuning of said inductor with the system earth capacitance comprising a source of alternating-current potential, means for adjusting the frequency of said source, star-connected capacitors respectively joined with the conductors of said system, an inductance connected to the common point of said star connection, means for impressing said potential between the ground and said inductance, a reactive-factor meter disposed to be responsive to the phase relation between said potential and the combined currents thus caused to flow from said conductors to ground through said inductor and the system earth capacitance, said meter thus indicating the direction of deviation in grounding inductance tuning from the resonance condition at the frequency of the said impressed potential, and means whereby said meter may be further disposed to control the operation of said electrical dimension adjusting means of the inductor to automatically maintain a desired degree of tuning.

SAMUEL B. GRISCOM.